United States Patent Office 3,157,952
Patented Nov. 24, 1964

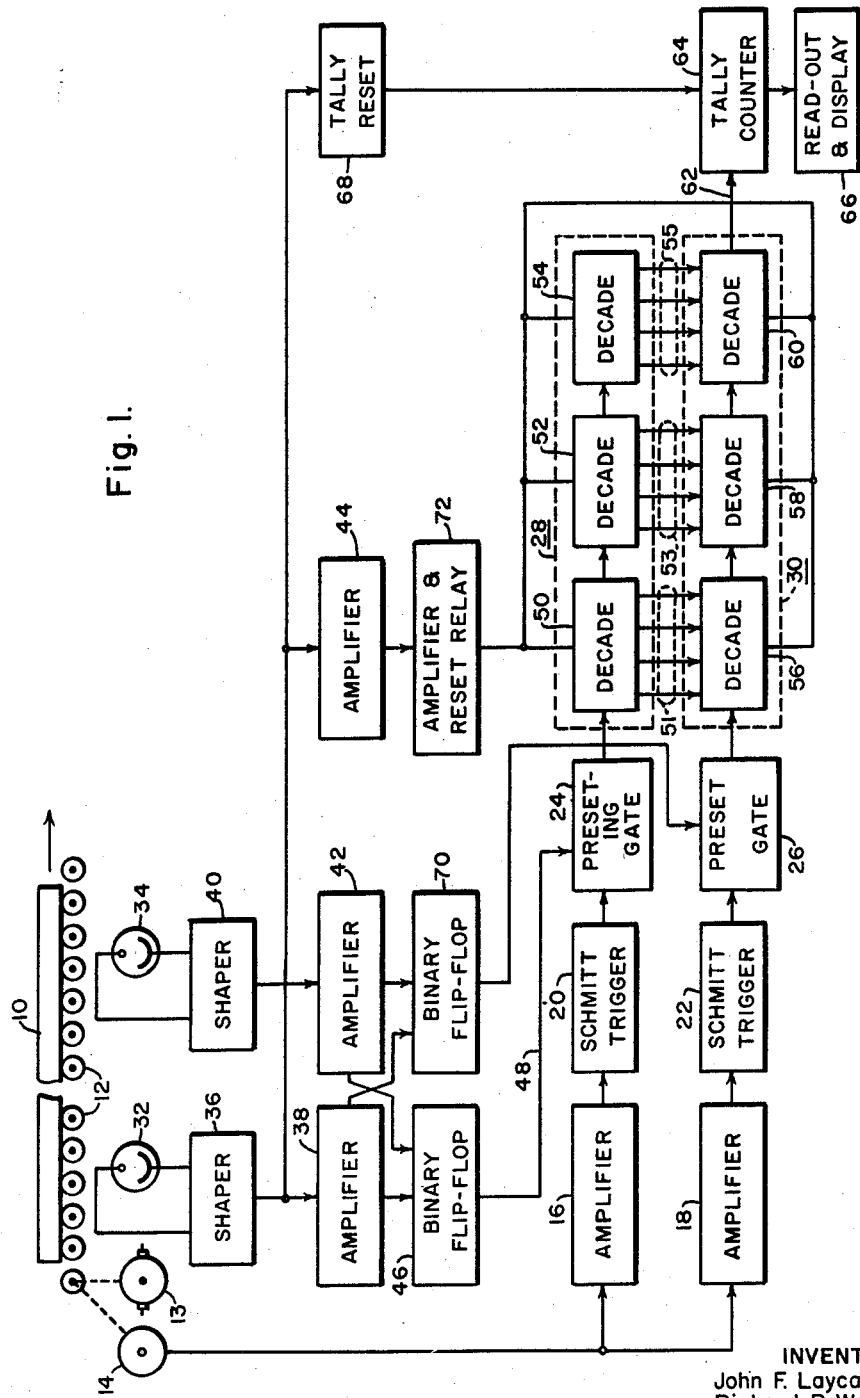

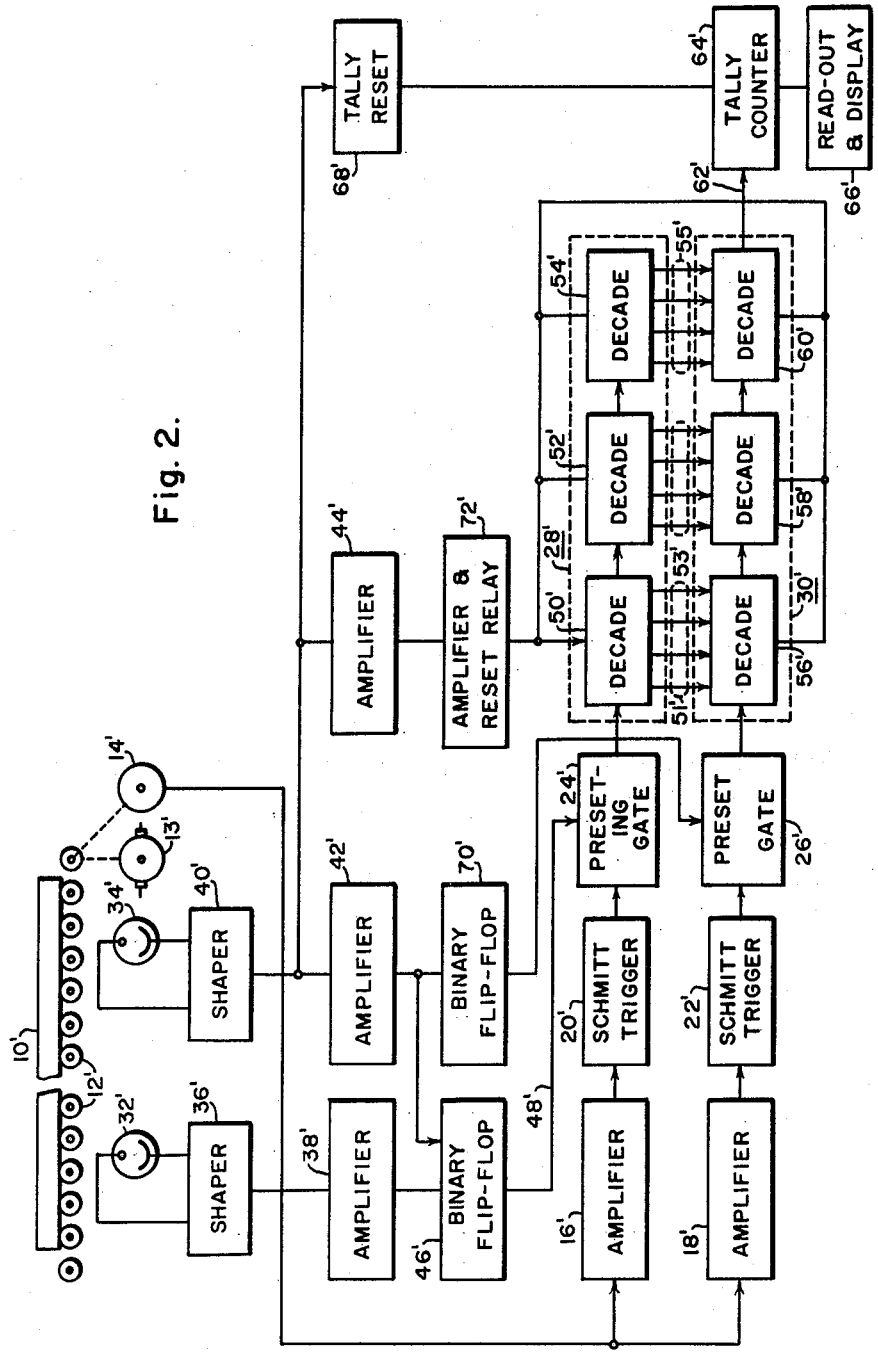

3,157,952
DIMENSIONAL GAGE
John F. Laycak, Duquesne, and Richard R. Webster, Bethel Park, Pa., assignors to Jones & Laughlin Steel Corporation, Pittsburgh, Pa., a corporation of Pennsylvania
Filed Aug. 17, 1962, Ser. No. 217,736
17 Claims. (Cl. 33—141)

This invention relates to apparatus for measuring the edge-to-edge dimensions of an article, and more particularly to a non-contacting length gage for moving articles.

Although not limited thereto, the present invention is particularly adapted for use in steelmaking and other related processes where improved yields may be obtained if the dimensions of the products are known during the various processing stages. For example, steel shapes such as angles, channels, I-beams and the like, all of different cross-sectional areas, are rolled from hot slabs or billets of varying weights. As a consequence, the lengths of the resulting shapes cannot be accurately controlled, and if the shearman who cuts the shapes into ordered lengths is not appraised of their dimensions as they come from the rolling mill, excessive waste in shorts and end crops is likely to result. In other words, the shearman can much more efficiently utilize the material as it comes from the rolling mill if he is appraised of its total length before cutting it into smaller, ordered lengths.

The problem of measuring the lengths of such shapes is complicated because of high product speeds and the physical nature of the product itself. That is, the shapes, as they come from the rolling mill, are hot and irradiant meaning that the measuring apparatus must be of the non-contacting type. Furthermore, although the shapes pass over rolls to which a tachometer may be attached, the rolls for each shape are of different diameters and are subject to wear so that a simple tachometer measuring system is unsatisfactory, particularly when it is remembered that many different shapes are processed at the same cutting station, meaning that rolls of different diameters must be used for each different shape.

As an overall object, the present invention seeks to provide new and improved apparatus for automatically measuring the edge-to-edge dimensions of various articles.

As a further object, the invention provides new and improved dimensional measuring apparatus for moving articles capable of being used regardless of the cross-sectional shape of the product measured and the diameters of conveyor rolls over which it travels.

Another object of the invention is to provide non-contacting length measuring apparatus of the type described which will continuously and non-destructively measure the extent of products moving at high speeds.

Still another object of the invention is to provide dimensional measuring apparatus of the type described having a high degree of accuracy.

In accordance with the embodiments of the invention shown herein, there is provided a tachometer generator or the like operatively connected to conveyor rolls over which the article to be measured passes, the tachometer producing an oscillatory signal having a frequency which varies as a function of the speed of the article being measured. Spaced along the path of travel of the article are first and second sensing devices each of which is adapted to produce an electrical signal when the leading edge of the article passes thereby. Also included in the apparatus are first and second counters, the first counter being adapted to preset the second counter to count a predetermined number of oscillations from the tachometer or other similar device.

In the operation of the device, the first or presetting counter is enabled to count oscillations while the leading edge of the article passes between the aforesaid sensing devices. If it is assumed that 400 oscillations have been counted while the leading edge of the article passes from the first to the second sensing device and that the sensing devices are spaced apart by one foot, then the second counter mentioned above will be preset to produce an output pulse for each foot of the article being measured, and this regardless of the speed of the article over the conveyor rolls. After the second counter is thus preset in one embodiment of the invention, it will be actuated upon passage of the leading edge of the article over the second sensing device and will continue to produce output pulses until the trailing edge of the article passes the first sensing device. The result is that the number of output pulses plus one produced by the second counter will be a direct measurement of the length of the article in feet. These output pulses are then applied to a tally counter which is preset to count a number indicative of the length between sensing devices, rather than zero, such that when the aforesaid second counter is reset by passage of the article over the first sensing device, it will give an indication of the total length of the article expressed as the length increments actually counted by the second counter plus those increments indicative of the length between sensing devices which are not actually counted by the second counter.

In another embodiment of the invention, the system is the same as that described above except that the second counter is reset when the trailing edge of the article passes the second, rather than the first, sensing device, in which case the tally counter is reset to begin counting from zero rather than a number indicative of the length between sensing devices.

In accordance with another aspect of the invention, the aforesaid sensing devices are spaced apart as far as possible, say 100 feet. The number of counts from the first counter which are used to preset the second counter may then be divided by 100 such that the second counter will again produce an output pulse for each foot of length of the article being measured. In this latter case, however, the accuracy of the device will be much greater since the basic interval of length is divided to establish a precise increment of length, and errors resulting from the summation of many inaccurately defined small length intervals is eliminated.

The above and other objects and features of the invention will become apparent from the following detailed description taken in connection with the accompanying drawings which form a part of this specification, and in which:

FIGURE 1 is a schematic block diagram of one embodiment of the invention in which the second counter mentioned above is reset by passage of the trailing edge of the article being measured over the forward sensing device; and FIG. 2 is a schematic block diagram of another embodiment of the invention in which the second counter is reset by passage of the trailing edge of the article being measured over the trailing sensing device.

Referring now to FIG. 1 of the drawings, an article 10 whose length is to be measured passes over conveyor rolls 12. Connected to one of the conveyor rolls 12 is a tachometer generator 14. In the embodiment of FIG. 1, it is assumed that the roll to which the tachometer 14 is connected is driven as by motor 13, whereas the remainder of the rolls are idlers and comprise, in effect, a run-out table. The output of generator 14, being an alternating current signal, is applied to a pair of amplifiers 16 and 18; while the outputs of amplifiers 16 and 18 are, in turn, applied to Schmitt trigger circuits 20 and 22, respectively. As is well known to those skilled in the art, a Schmitt trigger circuit comprises a pair of electron valves, one of which conducts while the other is cut off and vice versa. The circuit may be made to change from one stable state to the other whenever the amplitude of an input signal applied thereto exceeds a predetermined value. Therefore, in the case of an alternating current input signal, the Schmitt trigger may, for example, change from one stable state to the other to produce a square-wave output pulse whenever the positive half cycle of the alternating current input signal exceeds a predetermined amplitude. The output of Schmitt trigger circuit 20 is applied to a presetting gate circuit 24, while the output of Schmitt trigger circuit 22 is applied to a preset gate 26, substantially as shown. Pulses passing through gate 24 are then applied to a presetting counter 28 while those passing through gate 26 are applied to a preset counter 30, the counters 28 and 30 being enclosed by broken lines. For a full and detailed description of the counters 28 and 30 and the manner in which counter 28 presets counter 30, reference may be had to copending application Serial No. 218,418, filed August 21, 1962 and assigned to the assignee of the present application. In the claims which follow this specification, the signal fed to the counters 28 and 30 is described as an "oscillatory" signal, it being understood that such an oscillatory signal includes, for purposes of definition in the present application, a square-wave signal, a sine wave signal, or any other signal of varying amplitude wherein voltage rises or excursions occur periodically.

In the particular embodiment of the invention shown in FIG. 1, it will be assumed that the article 10 being measured is hot and irradiant, meaning that it glows or gives off light. Consequently, the leading and trailing edges of the article may be sensed by photoelectric cells 32 and 34. That is, since the article 10 is irradiant, the photocells 32 and 34 will increase conduction when the leading edge of the article 10 passes thereby and will continue their increased state of conduction until the trailing edge passes. If the article 10 is not irradiant, a source of light may be positioned above the article such that a shadow will fall upon the photocells 32 and 34 when the leading edge passes thereby with the same overall effect (i.e., a change in conduction of the photocell). As will be seen, any type of device for sensing the leading and trailing edges of the article 10 may be employed in the present invention. Preferably, the sensing device is of the non-contacting type; however, in certain instances a contacting sensing device may be used if desired.

The output of photocell 32 is applied through shaper 36 to amplifiers 38 and 44 and tally reset 68. In a somewhat similar manner, the output of photocell 34 is applied through shaper 40 to amplifier 42. The output of amplifier 38, in turn, is applied to a binary flip-flop circuit 46 which, like the Schmitt trigger circuits 20 and 22 already described, includes two electron valves one of which conducts while the other is cut off and vice versa. In the case of the binary 46, however, the electron valves will switch from one stable state to the other whenever an input signal is applied thereto and will thereafter be switched back to their original states of conduction in response to a second input pulse. In this manner, it can be seen that the output of amplifier 38 can be used to cause the binary flip-flop 46 to change from one stable state to the other whereby an output voltage will appear on lead 48 to enable the presetting gate 24 to pass oscillations to counter 28. This occurs when the leading edge of the article 10 passes the photocell 32. When the leading edge of the article 10 passes photocell 34, a signal is applied to the flip-flop 46 from amplifier 42 to switch it back to its original state of conduction, with the result that the signal on lead 48 will revert to its original condition and the presetting gate 24 will be disabled. In this manner, it can be seen that the gate 24 will open to permit pulses from Schmitt trigger 20 to pass to the presetting counter 28 only during the time required for the leading edge of article 10 to travel from photocell 32 to photocell 34.

With reference now to the presetting counter 28, it comprises three decade counters 50, 52 and 54 connected in cascade. As is well known to those skilled in the art, a decade counter is one which will produce an output pulse each time ten input pulses or oscillations are applied thereto. Thus, by connecting the output of decade counter 50 to the input of decade counter 52, an output pulse will be produced from decade counter 52 in response to ten output pulses from decade counter 50, meaning that a total of 100 input pulses must be applied from gate 24 before an input pulse is applied to decade counter 54. Similarly, the third decade 54 is adapted to produce an output pulse only when 1000 input pulses have been applied from gate 24.

Each of the decades 50, 52 and 54 comprises four cascaded binary flip-flop circuits. Since each flip-flop completes a cycle for every two input pulses or triggers, a cascaded arrangement such as this provides a counter having a scale of the fourth power of two or sixteen. This scale of sixteen is permuted to a scale of ten by two resistor-capacitor feedback networks. In this manner, the circuit will operate as a conventional binary counter up to a count of four. On the count of four, the third flip-flop is triggered, sending a pulse through the first feedback network, thereby triggering the second flip-flop. Since it requires two inputs to trigger the second flip-flop, this is the equivalent of adding two input pulses; and the unit now corresponds to a binary count of six. On the count of six (which is the equivalent of eight in a true binary counter) the fourth flip-flop is triggered, sending a pulse through the second feedback network and triggering the third flip-flop. This is the same result as if four additional input pulses had been applied and the unit had a binary count of twelve stored in it. The unit again operates as a binary scaler for the remaining four pulses required to reset it to zero. Therefore, by adding the equivalent of six pulses, the scale of sixteen has been permuted to a scale of ten. By connecting leads 51, 53 and 55 to one of the two electron valves in each of the flip-flops in decades 50, 52 and 54, respectively, the number of pulses counted will be represented by specific ones of the leads being energized or "on" while other leads are deenergized or "off." These leads, in turn, are applied through suitable circuitry described in the aforesaid copending application Serial No. 218,418 to bias the flip-flops in decades 56, 58 and 60 in the preset counter 30. In this manner, the counter 30 will count a number of pulses before producing an output on lead 62 depending upon which leads from decades 50, 52 and 54 are energized.

If the counter 28 has counted, for example, 300 input pulses from gate 24, and if gate 24 is then disabled such that no further input pulses are applied to counter 28, the counter 30 will count 300 pulses from gate 26 before producing an output pulse on lead 62. The output pulses from lead 62 are, in turn, fed to a tally counter 64 which visually indicates the length of the article 10 in a read-out circuit 66. The tally counter 64 is reset by means of a tally reset circuit 68, this latter circuit being triggered by the photocell 32 when the trailing edge of article 10 passes thereby. On reset the tally counter retains the length representing the spacing between the two sensors 32 and 34.

The photocells 32 and 34 may be spaced apart by a very short interval, although it is desirable to have them spaced apart as far as possible. Let us assume, for example, that the photocells are spaced apart by only one foot. Let us assume further that at a mill speed of 1000 feet per minute and using conveyor rolls with a one foot circumference that 1000 oscillations are produced by the tachometer 14 per revolution. Under these circumstances, 1000 oscillations from the tachometer 14 will equal one foot of travel of the article 10. When the leading edge of the article 10 passes photocell 32, it will trigger the binary flip-flop 46 to enable gate 24 such that pulses will be passed to the presetting counter 28. At this time, the gate 26 will be disabled so that no pulses will pass to counter 30. Thus, as soon as the leading edge of the article 10 passes over the photocell 32, the tachometer 14 will feed pulses to counter 28, and for the case assumed, 1000 pulses will have been fed to counter 28 by the time that the leading edge reaches photocell 34. At this point (i.e., when the leading edge reaches photocell 34), the binary flip-flop 46 will be triggered to reverse its stable states of conduction whereby the gate 24 will be disabled. At the same time, a second binary flip-flop 70 will be triggered by the signal from photocell 34 to enable the gate 26. Since the counter 30 has now been preset to count 1000 pulses, and since 1000 pulses equals one foot of travel of the article 10, each output pulse on lead 62 which is fed to the tally counter 64 will represent a foot in length of the article 10. This action will continue until the trailing edge of the article 10 passes the photocell 32, whereupon the output of shaper 36 and amplifier 38 will change the stable states of the binary flip-flop 70 such that the preset gate 26 is disabled and the counter 30 stops counting. The total number of pulses counted by counter 64 plus the pulses retained by the counter and equivalent to the spacing between sensors 32 and 34 should, therefore, be the total length of the article with an average error of plus or minus one-half foot.

When the trailing edge of article 10 passes over photocell 32, a pulse is produced that performs three functions. First, it is amplified in amplifier 38 and applied to both of the binary flip-flops 46 and 70. The polarity of the pulse is such that it does not affect the binary 46. Binary flip-flop 70, on the other hand, is switched or returned to its original state, closing or disabling the preset gate 26 in preparation for the succeeding measurment. Second, the pulse at the output of shaper 36 is amplified in amplifier 44 and applied to the amplifier and reset relay 72 to reset counters 28 and 30 whereby they will again begin counting from zero. Finally, the pulse at the output of shaper 36 is applied to tally reset circuit 68 which, in turn, resets the tally counter 64 to begin counting from the number representing the spacing between sensors 32 and 34. At this point, the system is completely enabled to count for the next measurement.

For the case assumed above, the photocells 32 and 34 were spaced apart by only one foot. Let us assume that for some reason or other, such as an incorrect spacing of the photocells 32 and 34, the preset count of counter 28 does not represent exactly one foot, but rather is less than one foot by 1/8 inch. Let us assume further that the total length of the article 10 is 200 feet. Under the circumstances, it will be appreciated that the total length of the article as indicated by the tally counter 64 and display or read-out 66 is twenty-five inches less than the true length of article 10.

The possibility of an inaccuracy of this type may be greatly reduced or minimized by spacing the photocells 32 and 34 further apart. Assume, for example, that the total length of article 10 is 200 feet and that the distance between the photocells is now 100 feet rather than one foot and that the tachometer 14 generates 3000 pulses per foot of product travel. Tally counter 64 is now set to begin counting from 100. Under these circumstances, the presetting decades 28 will require three additional decades added to their input and will have stored or counted 300,000 oscillations, but only the oscillations registered (300) on the first three decades 50, 52 and 54 will be automatically preset on the preset decades 56, 58 and 60. That is, the presetting counter 28 will effectively divide the oscillations applied thereto by 1000. The result is that any error resulting from an inaccurate spacing of the photocells 32 and 34 or other causes will effectively be reduced so that the accuracy of the device is much greater than it is for a smaller spacing of the photocells. For the case assumed, 300 pulses applied to counter 30 from preset gate 26 will represent one-tenth foot of length of the article 10, and the resulting pulses on lead 62 occurring for each increment of length beyond the first 100 feet of article 10 will be counted in counter 64 and added to the 100 feet already displayed on unit 66. Finally, the pulse at the output of shaper 36 is applied to tally reset circuit 68 which, in turn, resets the tally counter 64 to begin counting from 100. At this point, the system is completely enabled for the next measurement.

The necessity for resetting counters 28, 30 and 64 when the trailing edge of the article 10 passes over photocell 32 will be understood when it is remembered that only the roll connected to tachometer generator 14 is driven by motor 13; whereas the remaining rolls are idlers. Actually, a plurality of driven rolls will proceed the idler rolls, only the last of the driven rolls being shown herein. Since the rolls between the photocells 32 and 34 in the embodiment of FIG. 1 are idlers, slippage may occur between the article 10 and those rolls with the result that the oscillations produced by tachometer generator 14 will not necessarily be a true indication of the length of the article 10 as its trailing edge passes between the photocells. In other words, if slippage should occur between the article 10 and the conveyor rolls 12, or if the article 10 should slow down in passing over the idler rolls, the roll to which the motor 13 and tachometer generator 14 are connected will nevertheless be driven at a constant speed, meaning that the number of oscillations produced by the tachometer generator 14 during the time that the trailing edge of article 10 passes between photocells 32 and 34 will not be a true indication of the last increment of length of the article 10 between the photocells. This is particularly true in a case where the photocells are spaced apart by large distances.

In FIG. 2 another embodiment of the invention is shown having circuit components identical to those shown in FIG. 1. Accordingly, elements in FIG. 2 corresponding to elements in FIG. 1 are identified by like, primed reference numerals. In the case of the embodiment of FIG. 2, however, it is assumed that all of the rolls between the photocells 32' and 34' are driven, only one of the drive motors 13' being shown in the drawings. In this case, since the rolls between the photocells 32 and 34 are driven, slippage will not occur between the article 10 and those rolls with the result that the output of a tachometer 14', for example, will be a true indication of the length of article 10 as its trailing edge passes between photocells 32' and 34'. Accordingly, in the embodiment of FIG. 2, the amplifier 44' and tally reset 68' are connected to the output of shaper 40' rather than shaper 36' whereby the counters 28, 30 and 64 will be reset when the trailing edge of the article 10 passes over photocell 34' rather than photocell 32'. Furthermore, in the case of the embodiment of FIG. 2, the output of amplifier 38' need not be applied to binary flip-flop 70' since the flip-flop 70' will now be responsive to the passage of the trailing edge of the article over photocell 34' to disable the gate 26. Since the gate 26' will not be disabled until the trailing edge of article 10' passes over photocell 34', the tally counter is preset to begin counting from zero, rather than from a number indicative of the incremental length between the photocells 32' and 34', and is reset to begin counting from zero by the tally reset circuit 68' whenever the trailing edge of article 10' passes over photocell 34'. Other than the foregoing, the operation of the circuit of FIG. 2 is the same as that of FIG. 1.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that the invention could also be used in an installation where the article being measured is stationary and the photocells or other sensing devices, maintained at a set spacing, are moved along the length of the article while the tachometer 14 is operatively connected to the sensing devices such that it will produce an oscillatory signal having a frequency which varies as a function of the speed of the sensing devices along the length of the article being measuerd.

We claim as our invention:

1. Apparatus for measuring the edge-to-edge dimension of an article comprising first and second edge sensing devices spaced along said dimension, means for producing relative movement between the article and the sensing devices along a path extending parallel to said dimension whereby each sensing device will intercept both edges of the dimension being measured, the first of said devices to intercept an edge of the article being adapted to produce a first signal when it intercepts said edge and the second of said devices to intercept the same edge being adapted to produce a second signal when it intercepts said edge, means for producing an oscillatory signal having a frequency which varies as a function of the rate of said relative movement, a first counter for counting said oscillations after said second device intercepts said edge, a second counter for counting said oscillations, means responsive to said first signal from the first of said sensing devices for causing said second counter to count oscillations, and means responsive to said second signal from the second of said sensing devices for causing the second counter to stop counting oscillations, and presetting connections between the first and second counters such that the first counter will be preset to count the number of oscillations counted by the second counter between the occurrences of said first and second signals.

2. Apparatus for measuring the edge-to-edge dimension of an article comprising first and second edge sensing devices spaced along said dimension, means for producing relative movement between the article and the sensing devices along a path extending parallel to said dimension whereby each sensing device will intercept both edges of the dimension being measured, the first of said devices to intercept an edge of the article being adapted to produce a first signal when it intercepts said edge and the second of said devices to intercept the same edge being adapted to produce a second signal when it intercepts said edge, means for producing an oscillatory signal having a frequency which varies as a function of the rate of said relative movement, a first counter for counting said oscillations after said second sensing device intercepts said edge of the article, a second counter for counting said oscillations and adapted to preset said first counter to count a predetermined number of oscillations, means responsive to said first signal from the first of said sensing devices for causing said second counter to count oscillations, means responsive to said second signal from the second of said sensing devices for causing the second counter to stop counting oscillations, and a third counter for counting output pulses from said first counter.

3. The apparatus of claim 2 wherein the sensing devices are spaced apart by a known length and said predetermined number of oscillations will be counted by said first counter to produce an output pulse for every increment of said known length between said edges.

4. Apparatus for measuring the edge-to-edge dimension of an article comprising first and second edge sensing devices spaced along said dimension, means for producing relative movement between the article and the sensing devices along a path extending parallel to said dimension whereby each sensing device will intercept both edges of the dimension being measured, the first of said devices to intercept an edge of the article being adapted to produce a first signal when it intercepts said edge and the second of said devices to intercept the same edge being adapted to produce a second signal when it intercepts said edge, means for producing an oscillatory signal having a frequency which varies as a function of the speed of said relative movement, a first counter for counting said oscillations after the second of said devices intercepts the aforesaid edge, a second counter for counting said oscillations, means responsive to said first signal from the first of said sensing devices for causing said second counter to count oscillations, means responsive to said second signal from the second sensing device for causing the second counter to stop counting oscillations, presetting connections between the first and second counters arranged such that the first counter will be preset by the second counter to produce an output pulse each time it counts said predetermined number of oscillations, and means actuable when one of said sensing devices intercepts the other edge along said dimension opposite said first-mentioned edge for resetting said first and second counters.

5. The apparatus of claim 4 and including a third counter for counting output pulses from the first counter, and means actuable when the first of said sensing devices intercepts said other edge for resetting said third counter.

6. The apparatus of claim 4 and including a third counter for counting output pulses from the first counter, and means actuable when the second of said sensing devices intercepts said other edge for resetting said third counter.

7. Apparatus for measuring the edge-to-edge dimension of an article moving along a path extending parallel to said dimension comprising a first device along the path of travel of said article for sensing its leading edge and adapted to produce a first signal when the leading edge passes thereby, a second device along the path of travel of said article beyond the first device and adapted to produce a second signal when the leading edge of the article passes thereby, apparatus for producing an oscillatory signal having a frequency which varies as a function of the speed of said moving article, a first counter for counting the oscillations in said oscillatory signal after said leading edge is sensed by the second device, a second counter for counting the oscillations in said oscillatory signal and adapted to preset said first counter to count a predetermined number of oscillations, gate means for applying said oscillations to the second counter, means responsive to said first signal from the first sensing device for enabling said gate means to apply oscillations to said second counter, and means responsive to said second signal from the second device for disabling said gate means, the arrangement being such that the first counter will be preset to produce an output pulse each time it counts said predetermined number of oscillations.

8. Apparatus for measuring the edge-to-edge dimension of an article having a different optical appearance than the background surrounding it and moving along a path extending parallel to said dimension, comprising first photoelectric means positioned along the path of travel of said article and adapted to produce a first signal whenever the article is adjacent thereto, a second photoelectric means positioned along the path of travel of said article beyond the first photoelectric means and adapted to produce a second signal whenever the article is adjacent thereto, means for producing an oscillatory signal having a frequency which varies as a function of the speed of said moving article, a first counter for counting said oscillations after said leading edge passes said second photoelectric means, a second counter for counting said oscillations and adapted to preset said first counter to count a predetermined number of oscillations, gate means for applying said pulses to the second counter, means responsive to said first signal from the first photoelectric means for enabling said gate means to apply oscillations to said second counter, and means responsive to said second signal from the second photoelectric means for disabling said gate means, the arrangement being such that the first counter will be preset to produce an output pulse each time it counts said predetermined number of oscillations.

9. Apparatus for measuring the edge-to-edge dimension of an article moving along a path of travel extending parallel to said dimension, comprising a first device along the path of travel of said article for sensing its leading edge and adapted to produce a first signal when the leading edge passes thereby, a second sensing device along the path of travel of said article beyond the first device and adapted to produce a second signal when the leading edge of the article passes thereby, apparatus for producing an oscillatory signal having a frequency which varies as a function of the speed of said moving article, a first counter for counting said oscillations after said leading edge passes the second sensing device, a second counter for counting said oscillations, means responsive to said first signal from the first sensing device for causing said second counter to count oscillations, means responsive to said second signal from the second sensing device for causing the second counter to stop counting oscillations, and presetting connections between the first and second counters, the arrangement being such that the first counter will be preset by the second counter to produce an output pulse each time it counts said predetermined number of oscillations.

10. Apparatus for measuring the edge-to-edge dimension of an article moving along a path of travel extending parallel to said dimension comprising a first device along the path of travel of said article for sensing its leading edge and adapted to produce a first signal when the leading edge passes thereby, a second sensing device along the path of travel of said article beyond the first device and adapted to produce a second signal when the leading edge of the article passes thereby, apparatus for producing an oscillatory signal having a frequency which varies as a function of the speed of said moving article, a first counter for counting said oscillations, a second counter for counting said oscillations and adapted to preset said first counter to count a predetermined number of oscillations, first gate means for applying said oscillations to the second counter, second gate means for applying said oscillations to the first counter, means responsive to said first signal from the first sensing device for enabling said first gate means to apply oscillations to said second counter, and means responsive to said second signal from the second sensing device for disabling said first gate means while simultaneously enabling the second gate means whereby oscillations will pass through the second gate means to said first counter, the arrangement being such that the first counter will be preset to produce an output pulse each time it counts said predetermined number of oscillations.

11. Apparatus for measuring the edge-to-edge dimension of an article moving along a path extending parallel to said dimension comprising a first device along the path of travel of said article for sensing its leading edge and adapted to produce a first signal when the leading edge passes thereby, a second sensing device along the path of travel of said article beyond the first device and adapted to produce a second signal when the leading edge of the article passes thereby, apparatus for producing an oscillatory signal having a frequency which varies as a function of the speed of said moving article, a first counter for counting said oscillations, a second counter for counting said oscillations and adapted to preset said first counter to count a predetermined number of oscillations, first gate means for applying said oscillations to the second counter, second gate means for applying said oscillations to the first counter, means responsive to said first signal from the first sensing device for enabling said first gate means to apply oscillations to said second counter, and means responsive to said second signal from the second sensing device for disabling said first gate means while simultaneously enabling the second gate means to pass oscillations to the first counter, the arrangement being such that the first counter will be preset to produce an output pulse each time it counts said predetermined number of oscillations, and a third counter for counting the output pulses from said first counter.

12. The apparatus of claim 11 wherein the first and second sensing devices are spaced apart by a known length such that an output pulse will be produced by the first counter whenever said known length of the article, other than the first known length, passes the first sensing device, and the count of said third counter will be the total length of the dimension in increments equal to said known length between the sensing devices.

13. The apparatus of claim 11 wherein the first and second sensing devices are spaced apart by a known length such that an output pulse will be produced by the first counter whenever said known length, other than the first known length, of the article passes the first sensing device, and the count of said third counter will represent the extent of said article exceeding said known length between the sensing devices plus said known length between the sensing devices.

14. Apparatus for measuring the edge-to-edge dimension of an article moving along a path of travel extending parallel to said dimension comprising a first device positioned along the path of travel of said article for sensing its leading edge and adapted to produce a first signal when the leading edge passes thereby, a second sensing device along the path of travel of said article beyond the first device and adapted to produce a second signal when the leading edge of the article passes thereby, apparatus for producing an oscillatory signal having a frequency which varies as a function of the speed of said moving article, a first counter for counting the oscillations in said oscillatory signal, a second counter for counting the oscillations in said oscillatory signal and adapted to preset said first counter to count a predetermined number of oscillations, first gate means for applying said oscillations to the second counter, second gate means for applying said oscillations to the first counter, means responsive to said first signal from the first sensing device for enabling said first gate means to apply oscillations to said second counter, means responsive to said second signal from the second sensing device for disabling the first gate means while enabling the second gate means to apply oscillations to said first counter, the arrangement being such that the first counter will be preset to produce an output pulse each time it counts said predetermined number of oscillations, a third counter for counting the output pulses from said first counter, and means responsive to passage of the trailing edge of said article past one of said sensing devices for disabling said second gate means while simultaneously resetting said second counter.

15. Apparatus for measuring the edge-to-edge dimension of an article having a different optical appearance than the background surrounding it and moving along a path of travel extending parallel to said dimension, comprising first photoelectric means positioned along the path of travel of said article and adapted to produce a first signal whenever the article is adjacent thereto, second photoelectric means positioned along the path of travel of said article beyond the first photoelectric means and adapted to produce a second signal whenever the article is adjacent thereto, means for producing oscillations having a frequency which varies as a function of the speed of said moving article, a first counter for counting said oscillations, a second counter for counting said oscillations and adapted to preset said first counter to count a predetermined number of oscillations, first gate means for applying said oscillations to the second counter, second gate means for applying said oscillations to the first counter, means responsive to said first signal from the first photoelectric means for enabling said first gate means to apply oscillations to said second counter, and means responsive to said second signal from the second photoelectric means for disabling said first gate means.

16. In apparatus for measuring the edge-to-edge dimension of an article, first and second edge sensing devices spaced along said dimension, means for producing relative movement between the article and the sensing devices along a path extending parallel to said dimension whereby each sensing device will intercept both edges of the dimension being measured, the first sensing device being ahead of the second device along said path, a first counter operatively connected to both of said sensing devices and arranged to count pulses having a frequency proportional to the speed of said article between the time that the leading edge of said article is sensed by said second device and the time that the trailing edge of the article is sensed by the first device, a second counter for presetting said first counter such that the first counter will produce an output pulse each time it counts a number of input pulses equal to the number of pulses counted by the first counter, said second counter being operatively connected to both of said sensing devices and arranged to count pulses having a frequency proportional to the speed of said article between the time that the leading edge of the article is sensed by the first sensing device and the time that the leading edge is sensed by the second sensing device, and a third counter for counting output pulses from said first counter.

17. In apparatus for measuring the edge-to-edge dimension of an article, first and second edge sensing devices spaced along said dimension, means for producing relative movement between the article and the sensing devices along a path extending parallel to said dimension whereby each sensing device will intercept both edges of the dimension being measured, the first sensing device being ahead of the second device along said path, a first counter operatively connected to both of said sensing devices and arranged to count pulses having a frequency proportional to the speed of said article between the time that the leading edge of said article is sensed by said second device and the time that the trailing edge of the article is sensed by the second device, a second counter for presetting said first counter such that the first counter will produce an output pulse each time it counts a number of input pulses equal to the number of pulses counted by the first counter, said second counter being operatively connected to both of said sensing devices and arranged to count pulses having a frequency proportional to the speed of said article between the time that the leading edge of the article is sensed by the first sensing device and the time that the leading edge is sensed by the second sensing device, and a third counter for counting output pulses from said first counter.

References Cited in the file of this patent
UNITED STATES PATENTS
3,050,857     Pierce et al. _____ Aug. 28, 1962

ISAAC LISANN, *Primary Examiner.*